Jan. 31, 1956
A. KULLING
2,733,106
COOLING DEVICE FOR BEARINGS
Filed Oct. 12, 1951
2 Sheets-Sheet 2
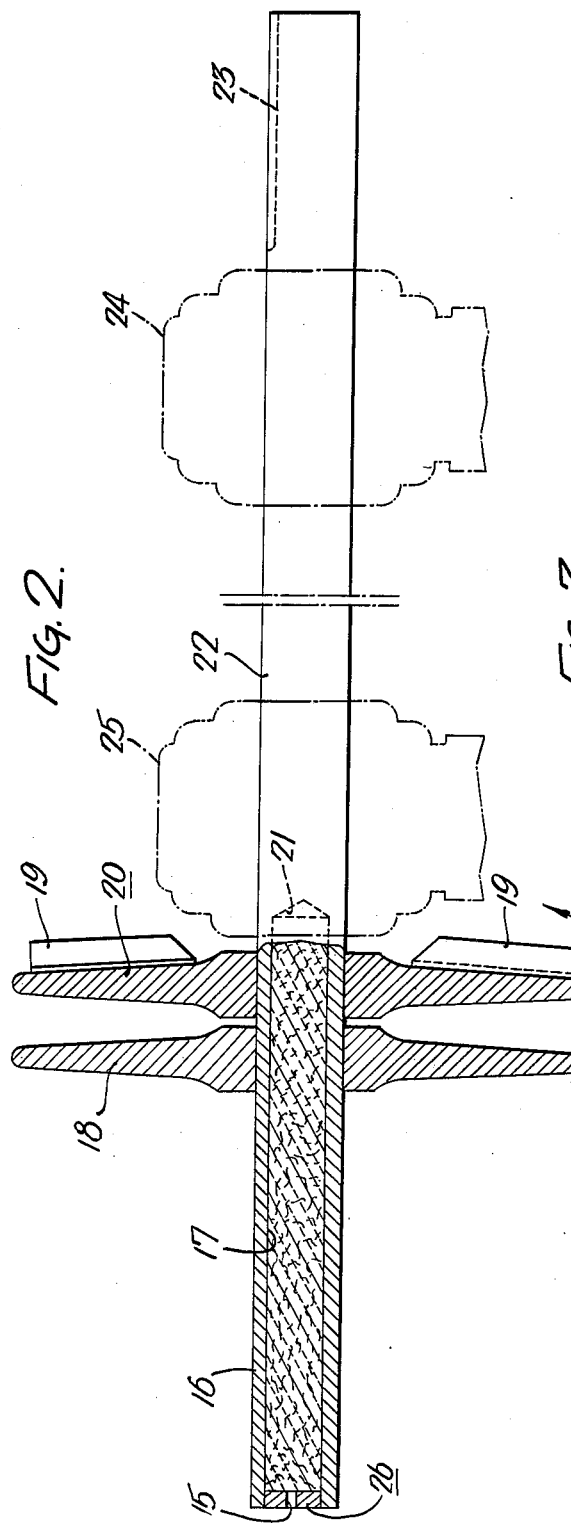
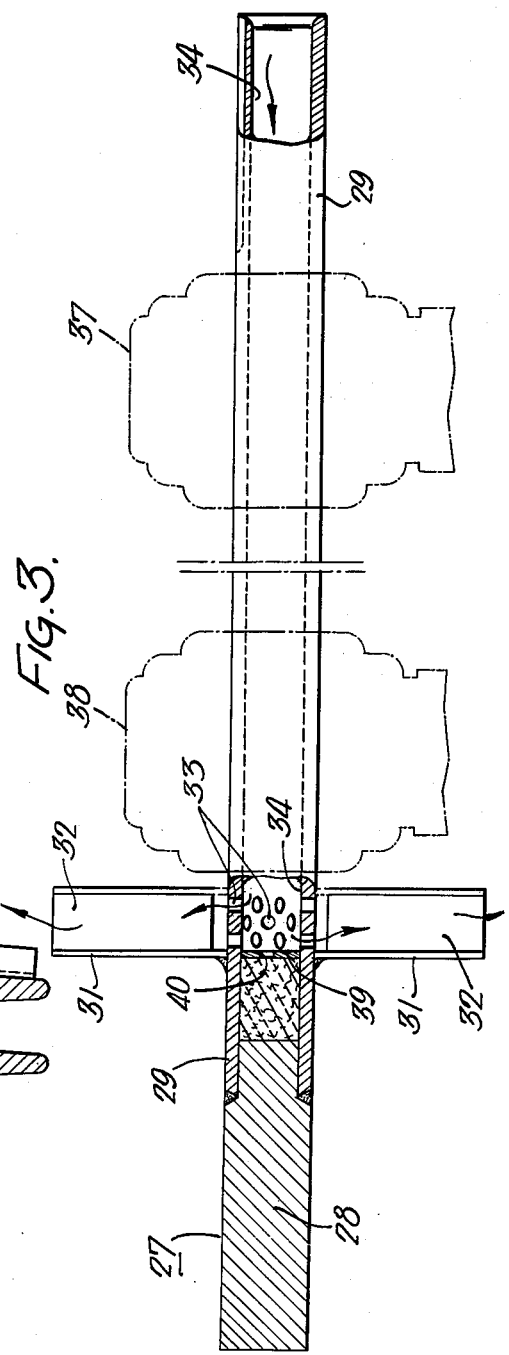
Inventor:
Arne Kulling
by his Attorneys
Howson & Howson

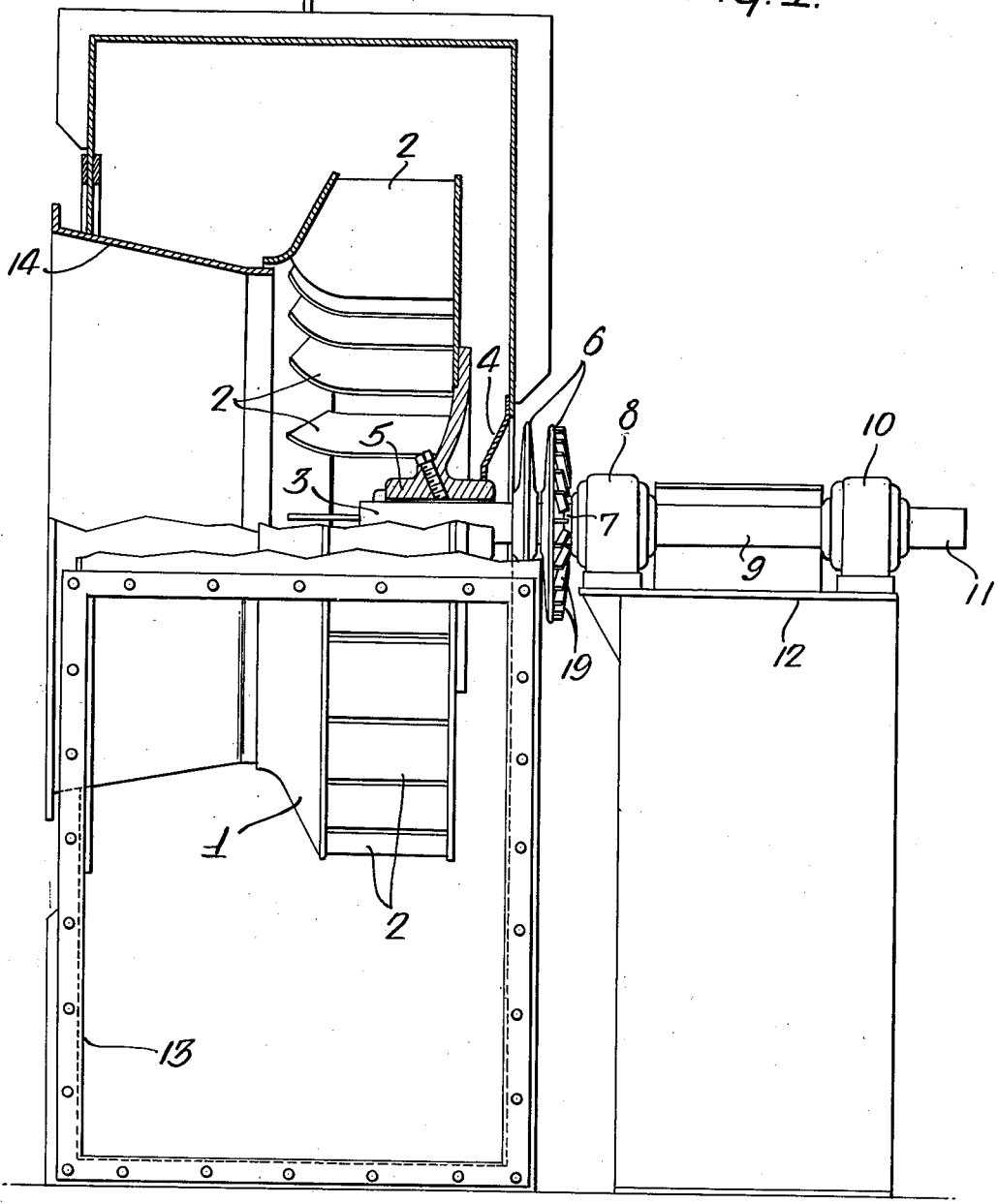

United States Patent Office 2,733,106
Patented Jan. 31, 1956

2,733,106

COOLING DEVICE FOR BEARINGS

Arne Kulling, Jonkoping, Sweden, assignor to AB Svenska Flaktfabriken, Stockholm, Sweden Application October 12, 1951, Serial No. 251,035

Claims priority, application Sweden October 30, 1950

3 Claims. (Cl. 308—77)

This invention relates to a cooling arrangement for bearings particularly for use in connection with induced draught fans with impellers for distributing hot gases. The impeller is mounted on one end of a shaft which is supported by one or more bearings and connected to a driving mechanism.

In order to eliminate injurious heating of such bearings for high temperature fans the following arrangement was previously used. A pipe closed at its inner end was inserted in a bore from the driving side of the shaft, i. e. on the end of the shaft situated farthest away from the hot gases. This pipe was connected to a source of cooling water. The cooling water was then caused to flow back again between the pipe and the bore of the shaft and was discharged into a separate box at the above mentioned shaft end. In many cases, however, it has proved to be a disadvantage to use these required water pipings partly on account of the fact that the induced draught fans often must be erected out of doors and far away from existing water pipings, and partly because the opening of the water tap often was omitted thus causing damage to the bearings. Furthermore, during the cold season the risk of freezing must also be considered. The present invention relates to a very simple and suitable solution of the problem and eliminates the above mentioned disadvantages.

The invention is characterized in that the shaft is provided with a central cavity at least between the impeller and the bearing cup adjacent to this impeller. According to a modification the cavity is entirely or partly filled with a material which is heat rejecting, air transmitting, non-hygroscopic and heat resisting. Rubbed asbestos has proved to be a suitable material for this purpose. Other objects of the invention will more fully appear from the attached claims and drawings showing different embodiments.

The invention will now be more fully described with reference to the drawings in which Figure 1 is an induced draught fan with a shaft supported by two bearing cups which are to be protected in accordance with the invention.

Figure 2 shows an embodiment with two cooling discs on the shaft bored from the flue gas side.

Figure 3 shows an embodiment with the shaft bored from the driving side and provided with cooling blades.

In Figure 1 an induced draught fan is designated 1 and the fan blades 2. The induced draught fan is mounted on one end of a shaft 3 which shaft is to be cooled in accordance with the invention in order to avoid injurious heating of the bearing cups 8 and 10 of the shaft. The bearing cups are mounted on a base plate 12. 5 designates the hub of the impeller and 4 is a hub cone. Different parts of the shaft are designated 7, 9 and 11. The outlet of the fan is designated 13 and its inlet 14.

In Figure 2 the shaft end 16 is assumed to support such an induced draught fan and 23 designates the driving side of the shaft where the shaft is provided with key ways for fastening the driving mechanism. In the present case the invention is applied to the shaft which is bored from the flue gas side to the bearing cup immediately situated. The obtained cavity 17, 21 can be entirely or partly filled with a material which is heat rejecting, air transmitting, non-hygroscopic and heat resisting, preferably rubbed asbestos. The cavity is covered with a disc 26 provided with an opening 15 for passing of the gaseous medium in the cavity. The shaft is provided with cooling discs 18, 20 in the present case two in number. The cooling disc adjacent to the bearing is provided with a number of cooling blades 19 distributed over the surface of the disc. These blades cool down the connection between the bored part 16 of the shaft and its solid part 22 when rotating the shaft. In this figure the bearings designated 24 and 25 correspond to the designations 10 and 8 in Figure 1. The right part of the shaft is broken at the cutting lines of the drawing whereby the bearings as a matter of fact are situated farther away from each other than what is shown in Figure 2.

Fig. 3 is a modification of a cooling device according to the invention. The part of the shaft 27 which is assumed to support the induced draught fan is solid whereas the remainder of the shaft from the driving side is provided with a cavity 34. As shown in the figure the shaft can in suitable manner be made of a solid shaft section 28 and a pipe section 29 which are connected to each other by welding or similar means. In the present case the bearings are designated 37, 38. In front of the first bearing 38 rods 31 are fastened which support cooling blades 32. In addition, the shaft or pipe portion 29 is provided with radial outlet openings 33 which are located between the bearing 38 and solid shaft portion 28 in confronting alignment with the blades 32. These radial outlets 33 are arranged in a plurality of series each extending circumferentially of the shaft and the outlets in one series are staggered with respect to the outlets in an adjacent series. Thus, when the shaft 27 is rotated the bearings of said shaft are cooled by air which is suctioned through the driving shaft and exhausted through the radial openings 33 perpendicularly from the shaft by the blades 32. In this case the cavity 34 may also be filled with a heat rejecting, air transmitting, non-hygroscopic and heat resisting material in front of the above mentioned cooling device. This will prevent transmission of heat from the shaft end to the other parts of the shaft and is covered by a disc 39 provided with an air hole 40.

It has been determined that satisfactory results are obtained with a cavity having a cross-sectional area of about .06 to .07 of the cross-sectional area of the shaft. As an example of the efficiency attained by this invention for instance at induced draught fans the following may be mentioned when a shaft speed of about 1700 revolutions per minute is presumed. In accordance with the Figure 2 showing a bored shaft provided with two cooling discs and six cooling blades a temperature of 41° C. and 35° C. of the bearing cup was obtained for the adjacent bearing respectively the bearing situated farthest away and at a room temperature of 24° C. and at a temperature of 800° C. on the shaft end surrounded by flue gases. Corresponding values were obtained with a completely solid shaft already at a flue gas temperature of about 400° C. At an embodiment of the cooling device in according with Figure 3 the temperature of the bearing cup proved to be 56° C. and 41° C. respectively at a flue gas temperature of 950° C. At this occasion the temperature of the room was 25° C. Thus it is possible by means of this intion to maintain the temperature of the bearing cup well under the prescribed value of 65°–70° C.

Some embodiments of the invention have been mentioned above as examples but also other modifications are possible within the scope of this invention. The invention can also be used at drying drums.

What I claim is:

1. A construction for cooling bearings, comprising a shaft having a solid portion at one end to mount an impeller and a hollow portion extending from said solid portion entirely to the other end of the shaft and constituting an inlet and passage for cooling gas, at least one bearing rotationally supporting the shaft along the hollow portion thereof, said shaft having radial outlet openings for the gas in the hollow portion thereof intermediate the bearing and the shaft solid portion and spaced from the latter, said radial outlets being arranged in a plurality of series each extending circumferentially of the shaft and the outlets in one of said series being staggered with respect to the outlets in an adjacent series and draft inducing means mounted exteriorly on the shaft at said radial openings therein to induce the flow of cooling gas longitudinally through the shaft from the said other end thereof and exhaust the same outwardly through said radial openings.

2. A construction for cooling bearings, comprising a shaft having a solid portion at one end to mount an impeller and a hollow portion extending from said solid portion entirely to the other end of the shaft and constituting an inlet and passage for cooling gas, at least one bearing rotationally supporting the shaft along the hollow portion thereof, said shaft having radial outlet openings for the gas in the hollow portion thereof intermediate the bearing and the shaft solid portion and spaced from the latter, said radial outlets being arranged in a plurality of series each extending circumferentially of the shaft and the outlets in one of said series being staggered with respect to the outlets in an adjacent series heat insulating material filling the hollow portion of the shaft intermediate the solid portion thereof and said radial openings, and draft inducing means mounted exteriorly on the shaft at said radial openings therein to induce the flow of cooling gas longitudinally through the shaft from the said other end thereof and exhaust the same outwardly through said radial openings.

3. A construction for cooling bearings, comprising a shaft having a solid portion at one end to mount an impeller and a hollow portion extending from said solid portion entirely to the other end of the shaft and constituting an inlet and passage for cooling gas, at least one bearing rotationally supporting the shaft along the hollow portion thereof, said shaft having radial outlet openings for the gas in the hollow portion thereof intermediate the bearing and the shaft solid portion and spaced from the latter, said radial outlets being arranged in a plurality of series each extending circumferentially of the shaft and the outlets in one of said series being staggered with respect to the outlets in an adjacent series heat insulating material filling the hollow portion of the shaft intermediate the solid portion thereof and said radial openings, an apertured disc in the hollow portion of the shaft providing a wall transversely thereof between the insulating material and the radial openings in said shaft, and draft inducing means mounted exteriorly on the shaft at said radial openings therein to induce the flow of cooling gas longitudinally through the shaft from the said other end thereof and exhaust the same outwardly through said radial openings.

References Cited in the file of this patent

UNITED STATES PATENTS

| | | |
|---|---|---|
| 1,953,540 | Ogden | Apr. 3, 1934 |
| 2,474,615 | Busquet | June 28, 1949 |
| 2,549,171 | Clayton | Apr. 17, 1951 |